UNITED STATES PATENT OFFICE.

JOHN LEONARD KELLOGG, OF BATTLE CREEK, MICHIGAN.

CEREAL COFFEE IN TABLET FORM AND THE PROCESS OF MANUFACTURING THE SAME.

1,159,949.  Specification of Letters Patent.  Patented Nov. 9, 1915.

No Drawing.  Application filed May 4, 1912.  Serial No. 695,292.

*To all whom it may concern:*

Be it known that I, JOHN L. KELLOGG, a citizen of the United States, residing at Battle Creek, Michigan, have invented certain new and useful Improvements in Cereal Coffee in Tablet Form and the Process of Manufacturing the Same, of which the following is a specification.

This invention relates to improvements in cereal coffee or food drinks, in tablet form, and the process of manufacturing the same.

The objects of the invention are to provide a tablet of cereal coffee or food coffee in tablet form which can be simply dissolved in hot water and ready for immediate use.

The invention is particularly adapted to cereal coffee, and it is desired to claim it especially as such, although the invention is much broader and could include other similar preparations.

To carry out my invention, I take the usual cereals prepared for coffee and boil the same for one hour in a steam retort, drain off the liquor and press the moisture out of the residue or grounds, and then boil the same down in a steam-jacketed mixer kettle until it is reduced to a thick syrup. I then add sugar in sufficient quantity to crystallize the syrup and bring the same out in crystalline form. I then pour the thick mixture onto a marble slab and cool the same. I then pulverize this mass by grinding the material through a suitable grinding machine. After the same has been thoroughly ground in this way, I dry out the residue of the moisture in a cold air drier by forcing cold air underneath a screen on which the material is spread. When the material has become bone dry I pass the same through a roller mill and bolt the powder to take out all of the bran and impurities of that kind, and pass the powder to automatic compression dies to press the same into tablet form. Any usual machine for making compressed tablets is made use of for this purpose. This method is especially adapted to cereal coffee, although the same can be made use of for pure coffee, and the same works very well indeed for a mixture of cereal coffee with pure coffee. The method also is adapted for use with chicory or other coffee substitutes.

Having thus described my invention, what I claim as new and desire to secure by Letters Patent is:

1. The process of preparing cereal coffee tablets consisting in boiling the browned and prepared cereal coffee in a steam retort until the same has become thoroughly steeped, draining the liquor and pressing the residue of the liquor out of the grounds, evaporating the liquor in a steam-jacketed mixer kettle until it becomes a thick syrup, adding a sufficient quantity of sugar to crystallize the mass of the syrup, cooling the same on a suitable cooling slab, pulverizing the cooled mass by passing through a suitable grinding machine, drying the pulverized mass by forcing cold air underneath and through the same until the material is bone dry, passing the same through a roller mill to completely pulverize the same, and bolting the pulverized product and compressing the powder into tablets, as specified.

2. The process of preparing cereal coffee consisting in boiling the browned and prepared cereal coffee in a steam retort until the same has become thoroughly steeped, draining the liquor and pressing the residue of the liquor out of the grounds, evaporating the liquor in a steam-jacketed mixer kettle until it becomes a thick syrup, adding a sufficient quantity of sugar to crystallize the mass of the syrup, cooling the same on a suitable cooling slab, pulverizing the cooled mass by passing through a suitable grinding machine, drying the pulverized mass by forcing cold air underneath and through the same until the material is bone dry, passing the same through a roller mill to completely pulverize the same, and bolting the pulverized product, as specified.

3. The process of preparing cereal coffee consisting in boiling the cereal coffee until thoroughly steeped, draining and expressing the liquor from the mass, evaporating in a steam-jacketed mixer kettle to a thick syrup, adding sugar to crystallize the mass, and then cooling and pulverizing the mass, bolting the pulverized product and compressing the powder into tablet form, as specified.

4. The process of preparing cereal coffee consisting in boiling the cereal coffee until thoroughly steeped, draining and expressing the liquor from the mass, evaporating in a steam-jacketed mixer kettle to a thick syrup, adding sugar to crystallize the mass, and then cooling and pulverizing the mass, as specified.

In witness whereof, I have hereunto set my hand and seal in the presence of two witnesses.

JOHN LEONARD KELLOGG. [L. S.]

Witnesses:
C. H. HUGHES,
RICHARD PUFFER.